S. KLEIN.
IMPLEMENT FOR DETACHING BUTTONS.
APPLICATION FILED OCT. 10, 1916.

1,261,134.

Patented Apr. 2, 1918.

INVENTOR.
Stanislaw Klein
BY Edward D. Mitchell
his ATTORNEY

A # UNITED STATES PATENT OFFICE.

STANISLAW KLEIN, OF COLLEGE POINT, NEW YORK.

IMPLEMENT FOR DETACHING BUTTONS.

1,261,134. Specification of Letters Patent. Patented Apr. 2, 1918.

Application filed October 10, 1916. Serial No. 124,801.

*To all whom it may concern:*

Be it known that I, STANISLAW KLEIN, a citizen of the United States, and resident of College Point, in the county of Queens and State of New York, have invented certain new and useful Improvements in Implements for Detaching Buttons, of which the following is a specification.

My invention relates to an implement for detaching buttons which have been attached to articles, and is more especially adapted to remove buttons from shoes. Buttons are usually attached to shoes either by means of thread or wire fasteners, and the present implement is adapted to remove the buttons attached in either of these ways.

In a patent issued to me on March 30th, 1915, No. 1,133,805, I have disclosed an implement for removing shoe buttons, and the present invention is a development of that disclosed in said patent.

I have found that the shanks of shoe buttons differ in size, and the device of the patent above referred to has rather a limited range in respect to the length of the shanks of buttons to be removed thereby. One of the objects of the present invention is to provide a button removing implement with means whereby it may be readily and simply adapted for removing buttons the shanks of which differ considerably in length.

In the implement of my above entitled patent the buttons were clipped off and the operator attempted to catch them by hand, and as a consequence buttons were frequently lost or dropped on the floor, necessitating the labor of gathering them together. Another object of the present invention is to provide means whereby the buttons as they are removed from the shoe will be collected and may then be emptied into any given receptacle, eliminating the loss of buttons and the necessity for picking them up from the floor.

Two embodiments of the invention are illustrated in the accompanying drawing, in which—

Figure 1:
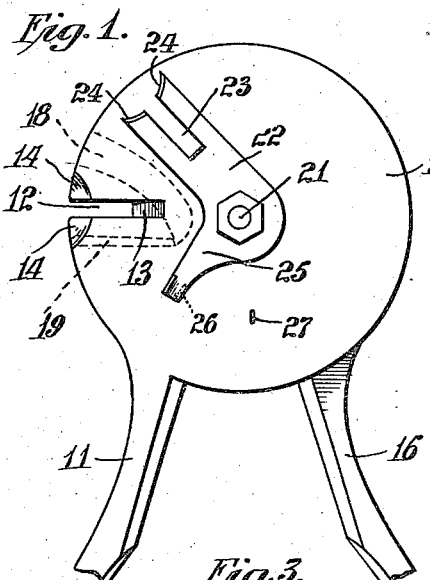
Figure 1 is a top plan view of one form of the invention showing the adjustment slide or lever in inoperative position.

The structure of the implement itself is substantially the same in all forms of the invention shown, and comprises essentially a pair of superposed disks concentrically pivoted, each disk being provided with an operating handle whereby relative motion may be given the disks, the latter being provided with suitable slots in which the button shank is received, and with suitable shearing means by which the thread or wire securing the button to the shoe is severed.

Referring to the drawing, and more particularly to Figs. 1 to 4 thereof, 10 denotes what may be termed the upper disk and 11 the handle thereof which is preferably, although not necessarily, formed integral with the disk 10. The upper disk 10 is provided with a radial slot 12 which is substantially rectangular in form and beveled or inclined at its rear end 13, the walls of the disk adjacent its front end being similarly beveled or inclined at 14. The beveled edges 14 are provided in order that the implement may be easily slipped under the button head when a button is to be detached.

The lower disk is denoted by the numeral 15 and its handle by the numeral 16. The lower disk is provided also with an orifice or opening 17, the walls defining which opening are beveled as indicated at 18 and 19. The wall 19 is undercut or reduced in thickness, in order that there may be attached thereto a shearing blade 20 which becomes effective to sever the button connection when the disks are rotated relatively to each other.

The disks are rotatively or pivotally secured together concentrically by means of a stud 21, and the handles 11 and 16 are normally pressed apart by a spring (not shown), the position of the parts when the device is inoperative being such that the opening 17 in the disk 15 spans the slot 12 in the disk 10. The relation of parts appears clearly from Figs. 3 and 4.

The means for adjusting the implement to detach what are called Milo buttons, the shanks of which are longer than that of the ordinary shoe button, preferably consists, in one form of the invention, of an angular lever or slide 22 pivotally supported by the stud 21 on the outer face of the upper disk 10. The longer arm of the slide 22 is bifurcated or slotted as at 23 and has it forward edges beveled as at 24. The shorter arm, 25, of the slide forms the operating end or finger hold for the lever 22. This slide is capable of being so moved that its bifurcation 23 may either be brought into or out of register with the slot 12 in the disk 10. This movement of the slide 22 is effected by means of the handle 25, and the extent of movement of the slide is limited by a spur 26 on the rear edge of the handle 25 entering either of the notches 27 or 28 formed in the upper face of the disk 10. In Fig. 1, where the slide 22 is out of operative position, the spur 26 is in the notch 28, and in Fig. 2 the spur 26 engages the notch 27, thus removably retaining the slide 22 in operative position with its bifurcation registering with the slot 12 of the disk 10.

It will be understood that to detach a button with the form of invention shown in Figs. 1 to 4, such button having a shank of normal length, the slide 22 is moved into the position shown in Fig. 1, the shank of the button is moved up into the slot 12 through the opening 17, and by means of the handles 11 and 16 the disks 10 and 15 are relatively rotated whereby the shear blade 20 moves past the edges of the slot walls 12 and severs the cord or wire by which the button was attached to the shoe or other article.

Figure 2:
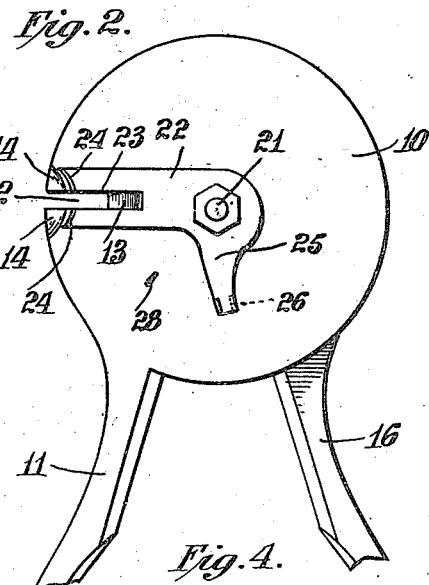
Fig. 2 is a similar view showing the slide or lever in operative position.
Figure 3:
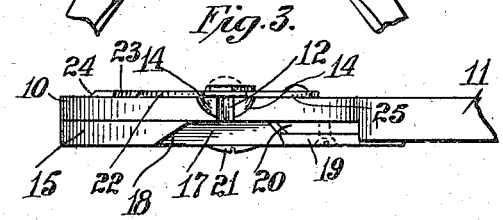
Fig. 3 is an edge view corresponding to Fig. 1.
Figure 4:
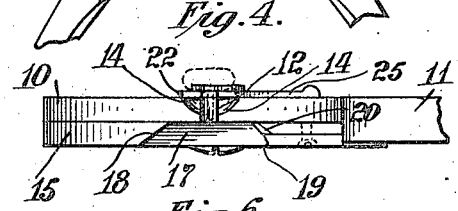
Fig. 4 is an edge view coresponding to Fig. 2.

If the length of the shank of the button is greater than the normal, the slide 22 is moved into the position shown in Fig. 2, and the disks are then relatively rotated to sever the connection between the button and the shoe.

Figure 5:
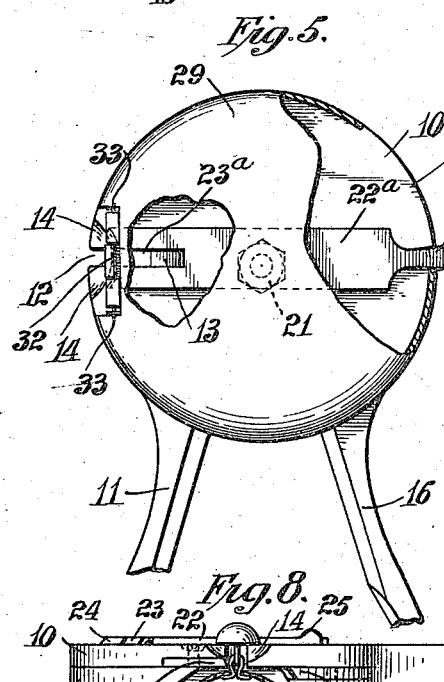
Fig. 5 is a top plan view with parts broken away, of a form of the invention in which a casing or housing is provided to receive the buttons detached by the implement.
Figure 6:
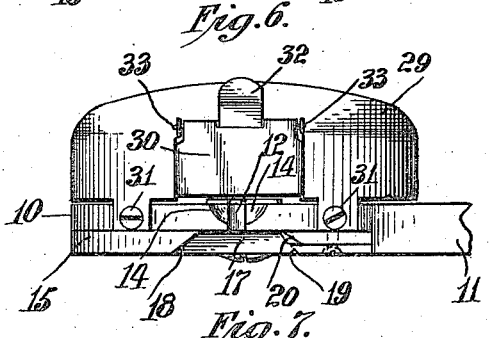
Fig. 6 is a side elevational view of the device shown in Fig. 5.
Figure 7:
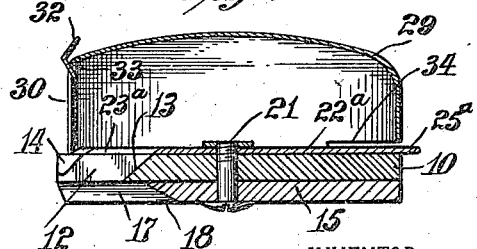
Fig. 7 is a substantially central, vertical sectional view of the device of Fig. 5.
Figure 8:
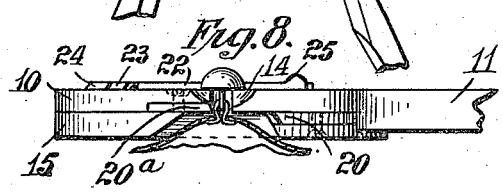
Fig. 8 is an edge view of the device of Figs. 1 to 4 showing a button in position to be removed from a part of a shoe.

In Figs. 5 to 7, showing a slightly modified form of the invention, the disks and their appurtenant parts are denoted by like reference characters as in the main form of the invention. In the modified form, I provide upon one of the disks a casing or housing 29 having a pivoted door or gate 30 arranged above the slot 12 in the disk 10. The housing 29 may be attached to the disk 10 in any suitable manner, as for example by means of the screws 31 passing through the lower edge of the housing wall into the periphery of the disk 10. The door 30 is provided with a projecting finger or operating piece 32, and is so hung on its pintle 33 that the door swings inwardly. A portion of the lower edge of the housing 29 is cut away as at 34 to permit the handle 25ª of the slide or lever 22ª being moved in the arc of a circle. In this modified form of the invention it will be noted that the slide 22ª is practically a straight bar with the bifurcation 23ª at its forward end, and in this modified form I dispense with forming a spur 26 on the slide, and providing notches 27 and 28 in the face of the disk 10, because the arcuate travel of the slide 22ª is limited by the ends of the cut away portion 34 at the lower edge of the housing 29. In Fig. 5 the slide 22ª is shown in its operative position with the bifurcated portion 23ª in register with the slot 12 in the disk 10. To place the slide 22ª out of operative position the handle 25ª is moved toward the left the entire limit of motion allowed it by the upper end wall of the slot 34. The operation of removing buttons by the modified form of Figs. 5 to 7 is the same as that described in connection with the main form of the invention. In this modified form, the buttons which are removed accumulate in the housing 29, and when it is desired to empty the latter the door 30 is moved about its pintle, and the implement canted so that the buttons fall out through the door opening.

What I claim is:—

1. An implement for the purpose specified, comprising relatively movable cutting members having registering openings therein, and means adapted to be moved into and out of register with said openings to modify the transverse thickness of said cutting members.

2. In an implement of the character described, the combination of a pair of superposed relatively movable disks having openings therein, cutting means at said openings, and means adapted to be moved into and out of register with said openings to modify the transverse thickness of the disks at the openings therein.

3. In an implement of the character described, the combination of a pair of relatively movable cutting disks having openings therein to receive the article to be cut, and a slide having a bifurcated portion adapted to be moved into and out of register with the opening in one of said disks.

4. In an implement of the character described, the combination of superposed relatively movable cutting members having registering openings therein, means adapted to move into and out of register with said openings to modify the transverse thickness of said cutting members, and means carried by said implement for receiving the articles severed thereby.

5. In an implement of the character described, the combination of a pair of superposed relatively movable cutting members having registering slots therein, means adapted to be moved into and out of register with said slots to modify the transverse thickness of said cutting members, a housing carried by said cutting members with an opening in proximity to the slot in one of said cutting members, and means for closing the opening in said housing.

Signed at New York city, in the county of New York and State of New York, this 12th day of September, A. D. 1916.

STANISLAW KLEIN.

Witnesses:
PAUL H. FRANKE,
R. B. RICHARDSON.